United States Patent [19]

Lenhardt

[11] Patent Number: 4,564,206
[45] Date of Patent: Jan. 14, 1986

[54] PEDAL DRIVE

[76] Inventor: Larry G. Lenhardt, 91666 Green Hill Rd., Junction City, Oreg. 97448

[21] Appl. No.: 540,534

[22] Filed: Oct. 11, 1983

[51] Int. Cl.⁴ ............................................. B62M 1/00
[52] U.S. Cl. ..................................... 280/252; 280/253
[58] Field of Search ............... 280/252, 253, 257, 261; 74/594.4, 594.1

[56] References Cited

U.S. PATENT DOCUMENTS

| | | |
|---|---|---|
| 3,132,877 | 5/1964 | Pontin .................................. 280/257 |
| 3,779,099 | 12/1973 | Trammell, Jr. ..................... 74/594.3 |
| 3,820,820 | 6/1974 | Kutz ..................................... 280/252 |

FOREIGN PATENT DOCUMENTS 485276  10/1953  Italy .................................... 280/252

Primary Examiner—Joseph F. Peters, Jr.
Assistant Examiner—Donn McGiehan
Attorney, Agent, or Firm—Seed and Berry

[57] ABSTRACT

A pedal drive for a bicycle having a driven wheel rotatably mounted to a frame, including a first sprocket rotatably mounted to the frame; a second sprocket rotatably mounted to the frame below the first sprocket and in planar alignment with it at a location spaced apart from the first sprocket; an endless chain extending about and interconnecting the first and second sprockets; a third sprocket rotatably mounted to the frame for rotary movement in response to the rotary movement of the first and second sprockets; an endless chain extending about and interconnecting the third sprocket and a sprocket attached to the driven wheel; left and right upper crank arms attached to the first sprocket and extending in generally opposite directions from each other; left and right lower crank arms attached to the second sprocket and extending in opposite directions from each other; a left pedal arm carrying a left pedal and pivotally connected to the left upper crank arm; a right pedal arm carrying a right pedal and pivotally connected to the right upper crank arm; a left link pivotally connected to the left pedal arm and pivotally connected to the left lower crank arm; and a right link pivotally connected to the right pedal arm and pivotally connected to the right lower crank arm. The upper and lower left-side crank arms are rotationally displaced from each other by at least 60 degrees, as are the upper and lower right-side crank arms, with the lower crank arms rotationally leading the upper crank arms. The left and right links have a length exceeding the left and right lower crank arms, and the left and right pedal arms exceed the left and right upper crank arms.

16 Claims, 6 Drawing Figures

PEDAL DRIVE

DESCRIPTION

1. Technical Field

The present invention relates generally to drive assemblies for a physically propelled mechanism and, more particularly, to a pedal drive used on bicycles and other pedal-driven mechanisms.

2. Background Art

Conventional pedal drives for bicycles generally include a rotatable shaft mounted to the frame of the bicycle, a sprocket attached to the shaft, and a pair of oppositely extending crank arms attached to the shaft. The crank arms each carry a pedal through which a rider, by applying a force to the pedals, can impart rotary motion to the sprocket. The sprocket is usually attached to a driven wheel rotatably mounted to the frame by an endless chain. The chain transmits the rotary movement of the sprocket to the driven wheel.

Such an arrangement requires a circular movement of the pedals with alternating downward and upward strokes for each pedal. The primary forces being applied to the pedals by the rider's leg during each stroke are directed downward or upward, with the upward force requiring that the pedals have straps which pass over the rider's foot. At two points in time during each complete circular travel of the pedals, one of the two pedals will be positioned at the highest point of its vertical travel and the other pedal will be positioned at the lowest point of its vertical travel. While in this position, the pedals are in transition between the downward and upward strokes and a force applied directly downward or upward to either pedal will produce no rotary motion on the sprocket. Furthermore, downward or upward forces applied as the pedals travel over the portion of the pedal path in the vicinity of this dead spot produce little power on the sprocket since the effective length of the crank arms is very short and little leverage is applied to the sprocket.

Such a dead spot requires that the rider apply to at least one of the pedals a horizontally directed force to rotate the pedals into a position which turns the sprockets sufficiently to again allow a downward or upward force on the pedals to cause a rotational force on the sprocket. Even further rotation is required before the crank arms have an effective length which translates the downward or upward forces, through the principles of leverage, into a significant rotational force on the sprocket. In the alternative, the rider can delay the application of the downward and upward forces until the momentum and normal rotation of the pedals carry them beyond the dead spot. During the travel of the pedals over the dead spot, the rider's legs are positioned in a manner which allows little transfer of physical power to the sprocket through the pedals, resulting in a delay before the more powerful portions of the downward and upward strokes occur.

Another problem with such as arrangement involves the fact that the rider must switch between the downward and upward strokes of each pedal at the same time. For a rider using primarily a downward stroke to drive the bicycle, the rider must wait for the one pedal, to which the downward force is applied, to reach its lowest point of vertical travel before the downward force can be transferred to the other pedal. If the transfer is too soon or late, the maximum power to the sprocket is not achieved. Of course, a delay always occurs during the period of time it takes to get the pedals over the dead spot. As discussed above, during the time the pedals travel over the portion of the pedal path in the vicinity of the dead spot, the crank arms are positioned generally vertically, and a downward or upward force on the pedals produces little leverage to rotate the sprocket.

It will therefore be appreciated that there has been a need for a pedal drive which does not have such a dead spot, allows the prompt transfer of downward force from one pedal to the other, minimizes the delay and loss of power resulting when the pedals travel in the vicinity of the dead spot, and provides a pedal path which allows a more efficient use of the leg movements of the rider. The present invention fulfills this need, and further provides other related advantages.

DISCLOSURE OF INVENTION

The present invention resides in a pedal drive for driving a bicycle or the like having a driven wheel rotatably mounted to a frame, and includes: a first sprocket rotatably mounted to the frame; a second sprocket rotatably mounted to the frame at a location spaced apart from the first sprocket, with the first and second sprockets being positioned generally one above the other and aligned in a common plane; first transmission means for transmitting rotary movement of one of the first and second sprockets to the other; second transmission means for transmitting rotary movement of the first and second sprockets to the driven wheel; a first crank arm attached to the first sprocket to rotate the first sprocket; a second crank arm attached to the first sprocket to rotate the first sprocket, with the first crank arm extending generally opposite to the first crank arm; a third crank arm attached to the second sprocket to rotate the second sprocket; a fourth crank arm attached to the second sprocket to rotate the second sprocket, with the fourth crank arm extending generally opposite to the third crank arm; a first pedal; a second pedal; and means for rotating the crank arms responsive to pedaling the first and second pedals with a downward stroke of the pedals exceeding an upward stroke of the pedals, as measured by the corresponding rotation of the cranks. The rotating means further provides a predetermined downward stroke pedal path and a predetermined upward stroke pedal path for the pedals, with the downward and upward paths for each of the pedals defining a generally vertically oriented, elongated, closedloop path. The distance between the vertical limits of the loop path is substantially greater than any horizontal distance between the loop path measured at corresponding vertical locations along the downward and upward paths comprising the loop path. The distance between the vertical limits of the loop path is at least four times greater than any horizontal distance between the loop path, and the loop path is positioned forward of an imaginery center line defined by the center of the first and second sprockets. The downward strokes of the first and second pedals overlap such that a first one of the pedals travels along an initial portion of its downward stroke as a second one of the pedals travels along a final portion of its downward stroke, with the second one of said pedals completing its upward stroke before the first one of the pedals completes its downward stroke.

More specifically, in the presently preferred embodiment of the invention, the first sprocket is attached to a first shaft rotatably mounted to the frame, with the first and second crank arms attached to the first shaft. The second sprocket is attached to a second shaft rotatably mounted to the frame at a location spaced apart from and below the first shaft, with the second and third crank arms attached to the second shaft. A first endless chain extends about and interconnects the first and second sprockets. A third sprocket is also attached to the second shaft, and a second endless chain extends about and interconnects the third sprocket and a sprocket attached to the driven wheel. The first pedal is carried by a first pedal arm, which is pivotally connected to the first crank arm, and to a first link. The first link is connected to the first pedal arm at a location spaced apart from the location of connection of the first pedal arm to the first crank arm. The first link is also pivotally connected to the third crank arm. The second pedal is carried by a second pedal arm, which is pivotally connected to the second crank arm and a second link. The second link is connected to the second pedal arm at a location spaced apart from the location of connection of the second pedal arm to the second crank arm. The second link is also pivotally connected to the fourth crank arm.

The first pedal arm has a length, defined by the distance between the locations of its connection to the first crank arm and the first link, at least as great as the length of the first crank arm, defined by the distance between the locations of its connection to the first pedal arm and the first shaft. Similarly, the second pedal arm has a length at least as great as the length of the second crank arm, defined by corresponding distance between part locations of connection. The first link has a length, defined by the distance between the locations of its connection to the first pedal arm and the third crank arm, at least as great as the length of the third crank arm, defined by the distance between the locations of its connection to the first link and the second shaft. Similarly, the second link has a length at least as great as the length of the fourth crank arm, defined by corresponding distances between part locations of connection. The first crank arm has a length substantially equal to the length of the third crank arm, and the second crank arm has a length substantially equal to the length of the fourth crank arm. In the presently preferred embodiment, the lower crank arms are substantially equal to or greater in length than the upper crank arms, and the first and second sprockets are of substantially equal diameter.

The first and third crank arms are rotationally displaced from each other, and the second and fourth crank arm are also rotationally displaced from each other. The rotational displacement is at least 60°, with the third and fourth crank arms rotationally leading the first and second crank arms, respectively, as the crank arms are rotated to provide a forward drive to the driven wheel. The first and second pedal arms each have an extension portion extending generally longitudinally beyond their respective locations of connection to one of the links, in a direction away from their location of connection to one of the upper crank arms. The extension portions of the pedal arms carry the pedals.

Other features and advantages of the invention will become apparent from the following detailed description taken in conjunction with the accompanying drawings.

BEST MODE FOR CARRYING OUT THE INVENTION

Figure 1:
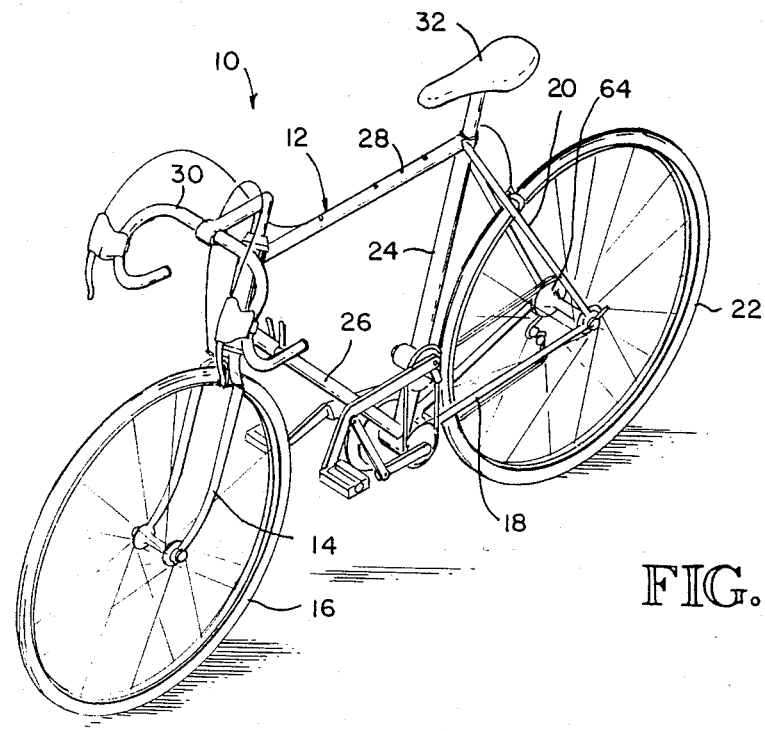
FIG. 1 is a perspective, left-side view of a bicycle embodying the present invention.
Figure 2:
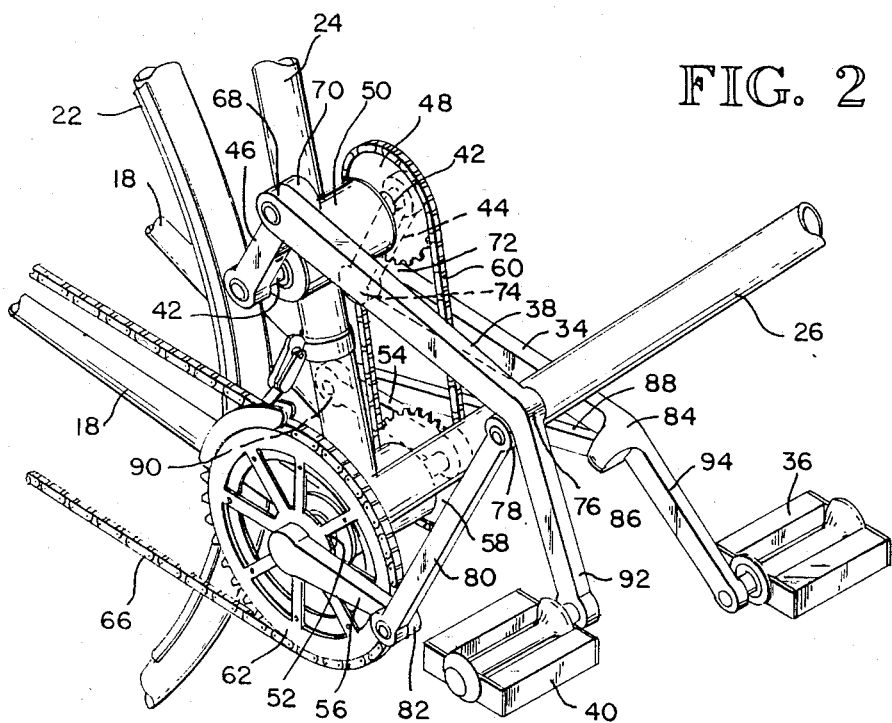
FIG. 2 is an enlarged, fragmentary, right-side perspective view of the pedal drive of FIG. 1.

As shown in the drawings for purposes of illustration, the present invention is embodied in a bicycle, indicated generally by reference numeral 10. The bicycle 10 includes a conventional frame 12 having a front fork 14 for rotatably mounting a front wheel 16, and a horizontal rear fork 18 and an inclined rear fork 20 for rotatably mounting a rear tire 22. The frame 22 also includes a rear upright bar 24, a diagonal bar 26 and a crossbar 28. The upright bar 24 is attached at its upper end to the inclined rear fork 20, and is attached at its lower end to the horizontal rear fork 18. The diagonal bar 26 is attached at its lower end to the lower end of the upright bar 24, and is attached at its upper end to the upper portion of the front fork 14. The crossbar 28 is attached at its forward end to the upper portion of the front fork 14, and is attached at its rearward end to the upper end of the upright bar 24. A pair of handle bars 30 are mounted to the upper portion of the front fork 14 and a seat 32 is mounted to the upper end of the upright bar 24.

In accordance with the invention, the bicycle 10 includes a forwardly extending left-side pedal arm 34 carrying a left-side pedal 36 and a forwardly extending right-side pedal arm 38 carrying a right-side pedal 40. As will be described in more detail below, the pedals 34 and 36 may be moved downward and upward along pedal paths which define a generally vertially oriented, elongated closed loop. An upper shaft 42 is rotatably mounted to the upright bar 24 and extends generally transverse to the frame 12, with an upper left-side crank arm 44 fixedly attached to the left end of the shaft and an upper right-side crank arm 46 fixedly attached to the right end of the upper shaft 42. The upper right-side crank arm 46 extends from the shaft in an opposite direction from that of the upper left-side crank arm 44. An upper left-side sprocket 48 is fixedly attached to the shaft 42 at its left end, intermediate the upper left-side crank arm 44 and the upright bar 24. The upper shaft 42 is rotatably attached to the upright bar 24 using conventional bearings contained in a cylindrical housing 50 which is rigidly attached to the upright bar 24.

The bicycle 10 also includes a lower shaft 52 rotatably mounted to the frame 12 at the juncture of the horizontal rear fork 18, the upright bar 24 and the diagonal bar 26, and extends generally transverse to the frame, parallel to the upper shaft 42. The lower shaft 52 is rotatably attached to the frame 12 using conventional bearings contained in a cylindrical housing 53 which is rigidly attached to the frame. A lower left-side crank arm 54 is fixedly attached to the left end of the shaft, and a lower right-side crank arm 56 is fixedly attached to the right end of the shaft. The lower right-side crank arm 56 extends from the lower shaft 52 in an opposite direction from that of the lower left-side crank arm 56. A lower left-side sprocket 58 is fixedly attached to the shaft 52 at its left end, intermediate the lower left-side crank arm 54 and the frame 12. The upper left-side sprocket 48 and the lower left-side sprocket 58 are of the same diameter and are interconnected by an endless chain 60 to transfer rotary movement of the one sprocket to the other. A larger diameter, lower right-side sprocket 62 is fixedly attached to the shaft 52 at its right end, intermediate the lower right-side crank arm 56 and the frame 12. The lower right-side sprocket 62 is interconnected with a rear right-side sprocket 64 by an endless drive chain 66 to transfer rotary movement of the lower right-side sprocket to the rear right-side sprocket. The rear right-side sprocket 64 is connected to the rear wheel 22 using conventional gearing (not shown).

The right-side pedal arm 38 is pivotally attached at a rearward end 68 to an end 70 of the upper right-side crank arm 46. Similarly, a rearward end 72 of the left-side pedal arm 34 is pivotally attached to an end 74 of the upper left-side crank arm 44. A midportion 76 of the right-side pedal arm 38 is provided with a lug 78 to which one end of a right-side link arm 80 is pivotally connected. The other end of the right-side link arm 80 is pivotally connected to an end 82 of the lower right-side crank arm 56. Similarly, a midportion 84 of the left-side pedal arm 34 is provided with a lug 86 to which one end of a left-side link arm 88 is pivotally connected. The other end of the left-side link arm 88 is pivotally connected to an end 90 of the lower left-side crank arm 54. The midportions 76 and 84 of the right-side and left-side pedal arms 38 and 34 form knees from which the left-side and right-side extension arms 92 and 94, respectively, extend downward. The right-side pedal 40 is pivotally attached to the end of the right-side extension arm 92, and the left-side pedal 36 is pivotally attached to the end of the left-side extension arm 94.

In the presently preferred embodiment of the invention, the right-side link 80 has a length, defined by the distance between the location of its connection to the right-side pedal arm 38 and the lower right-side crank arm 56, that is greater than the length of the lower right-side crank arm, as defined by the distance between the location of its connection to the right-side link arm and the lower shaft 52. In a like manner, the left-side link arm 88 has a length which is greater than the length of the lower left-side crank arm 54, as defined by the corresponding distances between locations of connection as just described for the right side. By using such lengths for the right-side and left-side links 80 and 88 relative to the lower right-side and left-side crank arms 56 and 54, respectively, the lugs 78 and 86 of the pedal arms 38 and 34 stay forward of the lower shaft 52, and hence so do the pedals 36 and 40, at all rotational positions of the lower crank arms.

The right-side pedal arm 38 has a length, as defined by the distance between the locations of its connection to the upper right-side crank arm 46 and the right-side link 80, substantially greater than the length of the upper right-side crank arm, as defined by the distance between the locations of its connection to the right-side pedal arm and the upper shaft 42. In like manner, the left-side pedal arm 34 has a length substantially greater than the length of the upper left-side crank arm 44, as defined by the corresponding distances between locations of connection as just described for the right side. These relative lengths for the pedal arms 34 and 38, the upper crank arms 44 and 46, the link arms 80 and 88, and the lower crank arms 54 and 56 assure that the pedals 36 and 40 will trace out a path which is at all times forward of an imaginery plane defined by the upper and lower shafts 42 and 52.

The pedals 36 and 40 trace out predetermined downward and upward stroke pedal paths, and by using the links 80 and 88 extending between the pedal arms 34 and 38 and the lower crank arms 54 and 56, the downward and upward paths for each of the pedals defining a generally vertically oriented, elongated, closed-loop path. The distance between the vertical limits of the loop path is substantially greater than any horizontal distance between the loop path measured at corresponding vertical positions along the downward and upward paths comprising the loop path, by as much as a factor of four. As such, the rider of the bicycle avoids the deficiencies of the conventional circular pedal path and can pump the pedals with downward and upward strokes along a path forward of the upright bar 24 and the seat 32 attached thereto, which provides for a more efficient transfer of power from the legs of the rider to the pedals.

Figure 6:
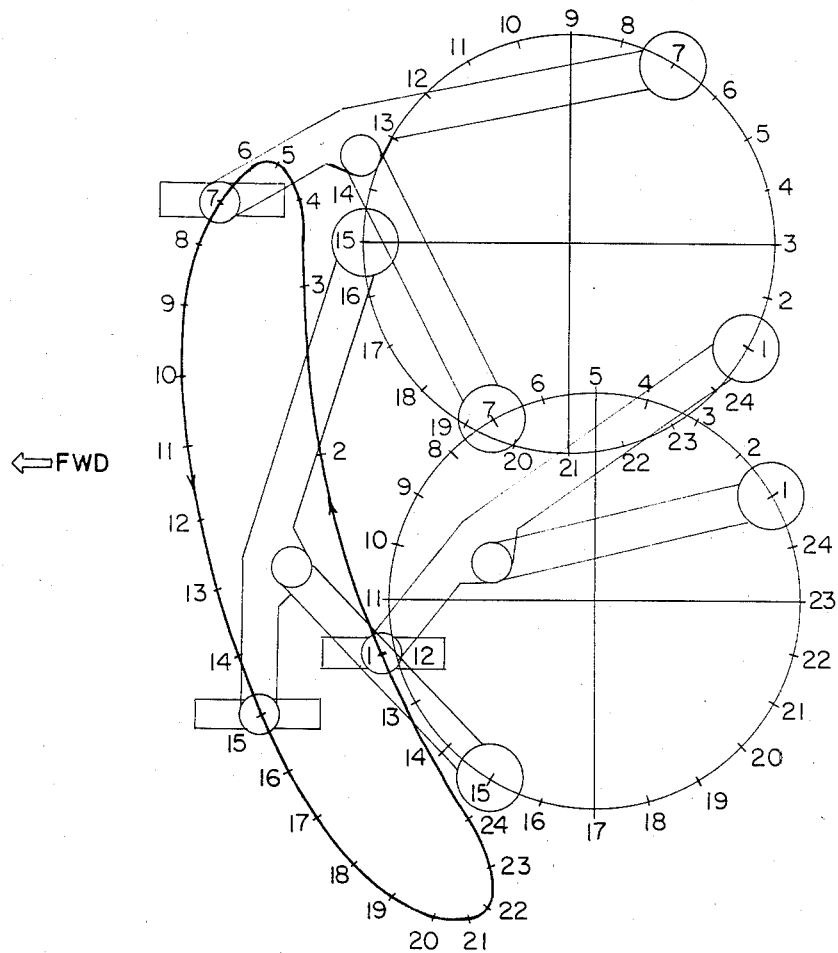
FIG. 6 is a schematic view of the pedal drive of FIG. 1 showing the various left-side crank arm angular positions and the corresponding positions of the left-side pedal along the closed-loop pedal path.

In the illustrated embodiment of the invention, upper crank arms 44 and 46 and the lower crank arms 54 and 56 are of the same length, however, the lower crank arms may be made longer than the upper crank arms to achieve a longer stroke. Furthermore, the upper right-side crank arm 46 is rotational displaced from the lower right-side crank arm 56 by at least 60 degrees, as are the upper left-side crank arm 44 and the lower left-side crank arm 54. The lower crank arms 54 and 56 rotationally leading the corresponding upper crank arms 44 and 46 as the crank arms are rotated to provide a forward drive to the rear wheel 22. The upper and lower left-side sprockets 48 and 58 have the same diameter. In FIG. 6, the various angular positions of the upper and lower left-side crank arms 44 and 54 are shown schematically, numbered from 1 to 24, with the crank arm travel between each position being 15 degrees. Also shown are correspondingly numbered positions of the left-side pedal 36 along the loop path corresponding to the crank arm positions.

Figure 3:
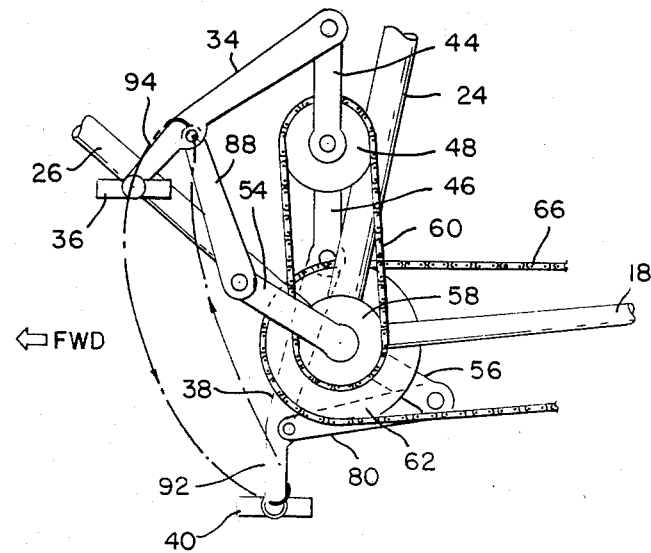
FIG. 3 is a left-side schematic view of the pedal drive of FIG. 1 showing the left-side pedal drive during a downward stroke and the right-side pedal at its lowest point of vertical travel.
Figure 4:
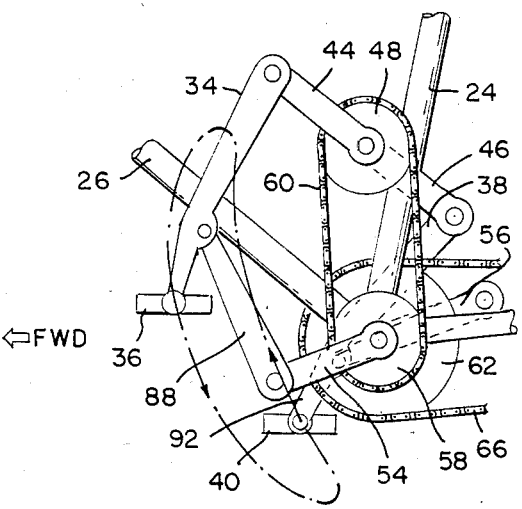
FIG. 4 is the schematic view of FIG. 3 showing the left-side pedal proceeding along its downward stroke and the right-side pedal during an upward stroke.
Figure 5:
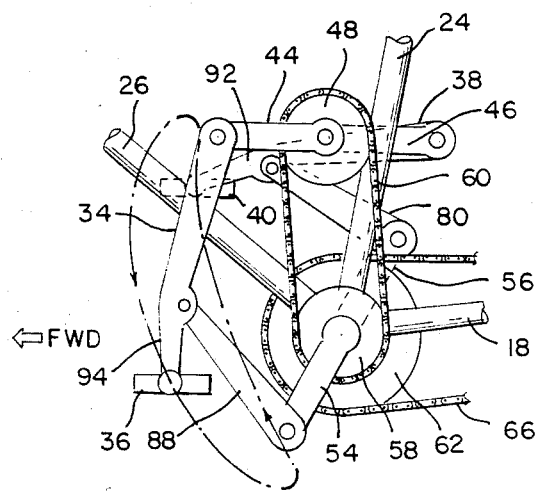
FIG. 5 is the schematic view of FIG. 4 showing the left-side pedal proceeding along its downward stroke, and the right-side pedal proceeding along its upward stroke and approaching its highest point of vertical travel.

As best illustrated in the sequence of pedal positions shown in FIGS. 3-5, with the present invention, the dead spot of conventional bicycle pedal drives, i.e., with the one pedal being at the highest point of its vertical travel while the other pedal is at the lowest point of its vertical travel, is eliminated. Furthermore, as measured by the corresponding rotation of the crank arms 44, 46, 54 and 56, the downward stroke of the pedals 36 and 40 exceeds the upward stroke of the pedals. This is clearly illustrated in FIG. 3, which shows the right-side pedal 40 at the lowest limit of its vertical travel and in the position to switch from the downward stroke to the upward stroke, while the left-side pedal 36 has already moved along an initial portion of its downward stroke. The result is an overlapping of the downward strokes of the pedals such that one of the pedals travels along an initial portion of its downward stroke at the same time the other pedal travels along a final portion of its downward stroke, with the latter pedal reaching the lowest point of its vertical travel and then completing its upward stroke before the first of the pedals completes its downward stroke. The rider may transfer the downward force he is applying to the one pedal which is approaching its lower vertical travel limit over to the other pedal at any time during the overlap period of the downward strokes of the pedal without waiting for the pedals to go through the dead spot experienced with conventional bicycle pedal drives.

Because of the use of angularly offset upper and lower crank arms 44, 46, 54 and 56, the leverage applied to the sprockets 48, 58 and 62 by the crank is improved. Even when one of the crank arms on one side of the bicycle is in a vertically oriented position, unlike in a conventional bicycle, the other crank arm on the same side is offset sufficiently that a downward force on the pedal on that side provides leverage and power to the sprockets.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. A pedal drive for driving a bicycle or the like having a driven wheel rotatably mounted to a frame, comprising:
   a first rotatable shaft mounted to said frame;
   a first sprocket attached to said first shaft;
   a second rotatable shaft mounted to said frame at a location spaced apart from said first shaft, said first and second shafts being positioned generally one above the other;
   a second sprocket attached to said second shaft and aligned in a common plane with said first sprocket; and
   a first endless chain extending about and interconnecting said first and second sprockets;
   a third sprocket attached to said second shaft;
   a second endless chain extending about and interconnecting said third sprocket and a sprocket attached to said driven wheel;
   a first crank arm attached to said first shaft to rotate said first shaft;
   a second crank arm attached to said first shaft to rotate said first shaft, said second crank arm extending generally opposite to said first crank arm;
   a third crank arm attached to said second shaft to rotate said second shaft;
   a fourth crank arm attached to said second shaft to rotate said second shaft, said fourth crank arm extending generally opposite to said third crank arm;
   a first pedal arm carrying a first pedal, said first pedal arm pivotally connected to said first crank arm;
   a first link pivotally connected to said first pedal arm at a location spaced apart from the location of connection of said first pedal arm to said first crank arm, and pivotally connected to said third crank arm;
   a second pedal arm carrying a second pedal, said second pedal arm pivotally connected to said second crank arm; and
   a second link pivotally connected to said second pedal arm at a location spaced apart from the location of connection of said second pedal arm to said second crank arm, and pivotally connected to said fourth crank arm.

2. The pedal drive of claim 1 wherein said first pedal arm has a length, defined by the distance between the locations of its connection to said first crank arm and said first link, at least as great as the length of said first crank arm, defined by the distance between the locations of its connection to said first pedal arm and said first shaft, and said second pedal arm has a length, defined by the distance between the locations of its connection to said second crank arm and said second link, at least as great as the length of said second crank arm, defined by the distance between the locations of its connection to said second pedal arm and said first shaft.

3. The pedal drive of claim 1 wherein said first link has a length, defined by the distance between the locations of its connection to said first pedal arm and third crank arm, at least as great as the length of said third crank, defined by the distance between the locations of its connection to said first link and said second shaft, and said second link has a length, defined by the distance between the locations of its connection to said second pedal arm and said fourth crank, at least as great as the length of said fourth crank arm, defined by the distance between the locations of its connection to said second link and said second shaft.

4. The pedal drive of claim 1 wherein said third crank arm and said third crank arm are rotationally displaced from each other, and said second arm and said fourth crank arm are rotationally displaced from each other.

5. The pedal driver of claim 4 wherein said rotational displacement is at lest 60°.

6. The pedal drive of claim 4 wherein said third crank arm rotationally leads said first crank arm and said fourth crank arm rotationally leads said second crank arm as said cranks are rotated to provide a forward drive to the driven wheel.

7. The pedal drive of claim 1 wherein said first pedal arm has an extension portion extending generally longitudinally beyond its location of connection to said first link in a direction away from its location of connection to said first crank arm, said extending portion carrying said first pedal, and said second pedal arm has an extension portion extending generally longitudinally beyond its location of connection to said second link in a direction away from its location of connection to said second crank arm, said extending portion carrying said second pedal.

8. The pedal drive of claim 1 wherein said first shaft is located generally above said second shaft.

9. The pedal drive of claim 8 wherein said third crank arm has a length, defined by the distance between the locations of its connection to said first link and said second shaft, substantially equal to or greater than the length of said first crank arm, defined by the distance between the locations of its connection to said first pedal arm and said first shaft, and said fourth crank has a length, defined by the distance between locations of its connection to said second link and said second shaft, substantially equal to or greater than the length of said second crank arm, defined by the distance between the locations of its connection to said second pedal arm and said first shaft.

10. The pedal drive of claim 1 wherein said first and second sprockets are of substantially equal diameter.

11. A pedal drive for driving a bicycle or the like having a driven wheel rotatably mounted to a frame, comprising:
- a first sprocket rotatably mounted to said frame;
- a second sprocket rotatably mounted to said frame at a location spaced apart from said first sprocket, said first and second sprockets being positioned generally one above the other and aligned in a common plane;
- first transmission means for transmitting rotary movement of one of said first and second sprockets to the other;
- second transmission means for transmitting rotary movement of said first and second sprockets to said driven wheel;
- a first crank arm attached to said first sprocket to rotate said first sprocket;
- a second crank arm attached to said first sprocket to rotate said first sprocket, said crank arm extending generally opposite to said first crank arm;
- a third crank arm attached to said second sprocket to rotate said second sprocket;
- a fourth crank arm attached to said second sprocket to rotate said second sprocket, said fourth crank arm extending generally opposite to said third crank arm;
- a first pedal operatively connected to said first and third crank arm;
- a second pedal operatively connected to said second and fourth crank arm; and
- means carrying said first and second pedal for rotating said crank arms responsive to pedaling said first and second pedals, with a downward stroke of said pedals exceeding an upward stroke of said pedals as measured by the corresponding rotation of said cranks.

12. The pedal drive of claim 11 wherein said means for rotating said crank arms further provides a predetermined downward stroke pedal path and a predetermined upward stroke pedal path for said pedals, said downward and upward paths for each of said pedals defining a generally vertically oriented, elongated, closed-loop path, with the distance between the vertical limits of said loop path being substantially greater than any horizontal distance between said loop path measured at corresponding vertical positions along said downward and upward paths comprising said loop path.

13. The pedal drive of claim 12 wherein the distance between the vertical limits of said loop path is at least four times greater than any said horizontal distance between said loop path.

14. The pedal drive of claim 12 wherein said loop path is positioned forward of an imaginery center line defined by and extending between the centers of said first and second sprockets.

15. The pedal drive of claim 11 wherein said downward strokes of said first and second pedals overlap such that a first one of said pedals travels along an initial portion of its downward stroke as a second one of said pedals travels along a final portion of its downward stroke, with said second one of said pedals completing its upward stroke before said first one of said pedals completes its downward stroke.

16. The pedal drive of claim 11 wherein said means for rotating said crank arms includes:
- a first pedal arm carrying said first pedal and pivotally connected to said first crank arm;
- a first link pivotally connected to said first pedal arm at a location spaced apart from the location of connection of said first pedal arm to said first crank arm, and pivotally connected to said third crank arm;
- a second pedal arm carrying said second pedal and pivotally connected to said second crank arm; and
- a second link pivotally connected to said second pedal arm at a location spaced apart from the location of connection of said second pedal arm to said second crank arm, and pivotally connected to said fourth crank arm.

* * * * *